United States Patent [19]
Taylor et al.

[11] 3,874,676
[45] Apr. 1, 1975

[54] COOLING APPARATUS FOR SHAFT SEAL
[75] Inventors: Owen S. Taylor, Jeannette; Donald P. Ravicchio, Appolo, both of Pa.
[73] Assignee: Carrier Corporation, Syracuse, N.Y.
[22] Filed: Mar. 21, 1974
[21] Appl. No.: 453,651

[52] U.S. Cl. .................................. 277/22, 277/75
[51] Int. Cl. ...................... F16j 15/28, F16j 15/40
[58] Field of Search ............... 277/3, 15, 16, 22, 59, 277/70, 71, 74, 75

[56] References Cited
UNITED STATES PATENTS

| | | | |
|---|---|---|---|
| 2,332,150 | 10/1943 | Huff | 277/22 |
| 3,128,941 | 4/1964 | Waibel | 277/75 |
| 3,360,272 | 12/1967 | Blom et al. | 277/3 |
| 3,484,113 | 12/1969 | Moore | 277/75 |
| 3,695,621 | 10/1972 | Damratowski | 277/75 |
| 3,819,191 | 6/1974 | Voitik | 277/22 |

Primary Examiner—Robert I. Smith
Attorney, Agent, or Firm—J. Raymond Curtin; Thomas J. Wall

[57] ABSTRACT

Shaft sealing apparatus for preventing process gases or fluids from escaping a rotary machine such as a turbine or a compressor. Oil under relatively high pressure, this is, pressure slightly higher than the pressure of the working substance contained in the machine, is caused to flow between the shaft and a plurality of axially aligned, free floating, bushings (seals) encompassing the closure end of the shaft. The oil is introduced into the flow path adjacent a first gas side seal and flows along the shaft towards atmosphere or an area of lower pressure through a series of oil breakdown seals positioned behind the gas side seal in relation to the direction of flow. A secondary low pressure oil system is arranged to pass cooling oil over the back side of the breakdown seals to prevent overheating of the seals during machine start-up or when the machine is operating under abnormal load conditions.

7 Claims, 2 Drawing Figures

COOLING APPARATUS FOR SHAFT SEAL

BACKGROUND OF THE INVENTION

This invention relates to shaft sealing apparatus and, in particular, to a "liquid to gas seal" for preventing high pressure working substances contained within a rotary machine, such as a turbine or compressor, from escaping about the shaft to a region of lower pressure or atmosphere.

The term, "liquid to gas seal," as herein used, generally refers to a sealing system utilizing a pressurized substance which acts as a dam against the working substance to prevent the working substance from passing into a region of lower pressure. It should be understood that the term "liquid to gas" is broad enough to include any fluid to fluid arrangement capable of producing the desired results.

A typical liquid to gas shaft seal is disclosed in U.S. Pat. No. 3,695,621 to Damratowski, et al. In this particular arrangement, the end wall of the machine is provided with an opening through which a rotor shaft is arranged to pass from a high pressure region within the machine to a region of lower pressure exterior the machine. A series of free floating bushings or seals, which encompass the shaft, are mounted within the wall opening. These seals include a gas side seal, located adjacent to the high pressure region, and a plurality of oil breakdown seals positioned behind the gas side seal and being spaced uniformly toward the low pressure side of the system. Oil, raised to a pressure slightly higher than the operating pressure of the fluids within the machine, is brought into contact with the shaft in the vicintiy of the gas side seal. Under the influence of the breakdown seals, a flow of high pressure oil is established which moves along the shaft from the region of high pressure toward the region of low pressure. The high pressure flow, in this environment, serves to prevent the fluids from escaping from the machine, provides for lubrication and cooling of the seals, and keeps the oil from entering the machine.

As evidenced by its wide commercial utilization, this type of liquid to gas sealing apparatus functions quite satisfactorily under most normal operating conditions. However, it has been noted that the flow of oil is considerably lessened during start-up or when the machine is operating at less than designed conditions. As a consequence, the lubrication provided by the oil to the breakdown seals is considerably reduced causing overheating of the components. Heretofore, oil injection has been utilized to supplement the high pressure oil flow during critical periods when the seals are in danger of being overheated. These oil injection systems, however, require complex control mechanisms for their regulation and operation, use an excessive amount of fluid, are costly to install, and are difficult to maintain.

SUMMARY OF THE INVENTION

It is therefore an object of the present invention to improve shaft sealing apparatus for use in a pressurized rotary machine.

It is a further object of the present invention to provide a liquid to gas sealing device for use in a fluid handling machine that is capable of efficiently removing excessive heat from the sealing region under varying machine load conditions.

It is a still further object of the present invention to reduce the quantity of high pressure oil required in a fluid to gas shaft sealing apparatus.

It is yet another object of the present invention to eliminate the need for fluid injection into a liquid to gas shaft sealing system during critical operating periods.

Yet another object of the present invention is to simplify the controls needed to maintain efficient operations of a liquid to gas shaft sealing system.

These and other objects of the present invention are attained by means of apparatus including an end wall having an opening for supporting a shaft of a rotary machine for processing pressurized substances, a series of free floating axially aligned bushings or seals encompassing the shaft in the opening including a gas side seal positioned adjacent to the high pressure side of the opening and a plurality of oil breakdown seals positioned behind the gas side seal, means to introduce a flow of oil at a pressure slightly higher than the working substance contained within the machine into contact with the shaft adjacent to the gas side seal whereby the oil flows between the shaft and the seals towards the region of lower pressure and cooling means independent of the high pressure oil flow, to cool the seals under all operating loads.

BRIEF DESCRIPTION OF THE DRAWINGS

For a better understanding of the present invention as well as other objects and further features thereof, reference is had to the following detailed description of the invention to be read with the accompanying drawings, wherein.

DESCRIPTION OF THE PREFERRED EMBODIMENT

Figure 1:
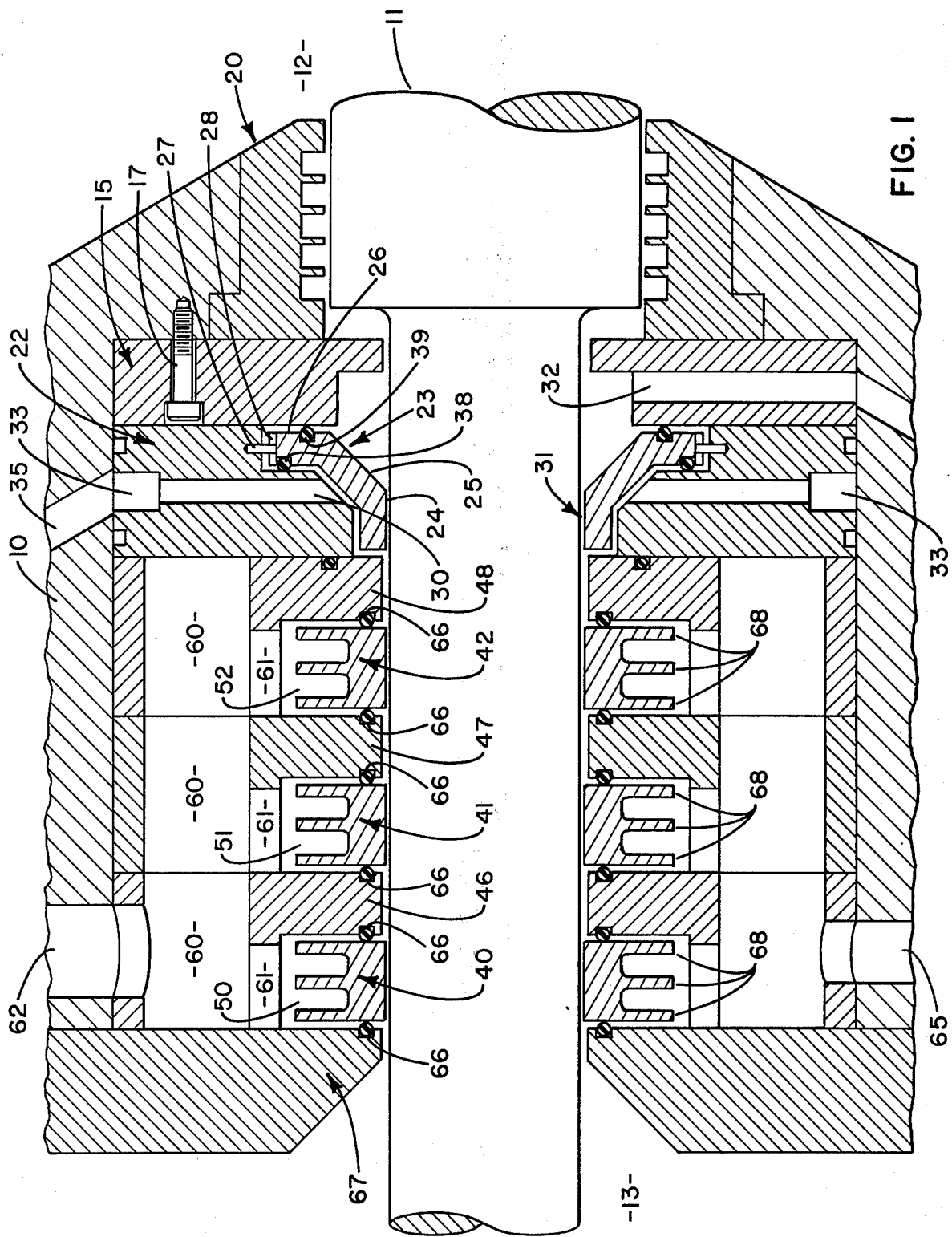
FIG. 1 is a partial sectional view of a rotary machine employing the teachings of the present invention.

As illustrated in FIG. 1, the end wall structure 10 of a rotary machine, such as a compressor or a turbine, is provided with an aperture through which passes a rotary shaft 11 for supporting the moving components of the machine. The shaft is arranged to extend in an axial direction from the high pressure machine region, generally referenced 12 and viewed at the righthand side of the wall in FIG. 1, to a low pressure region, generally 13. Conventionally, the low pressure region is at atmospheric pressure although slightly higher or lower pressures can be maintained without departing from the teachings of the present invention. The inner end wall of the aperture may be formed integral with the casing 10, or by an annular member 15 as illustrated in FIG. 1, that is fixedly attached to the casing structure as by means of cap screws 17. when so employed, the member 15 serves advantageously to position and retain a labyrinth seal member 20 encircling the shaft 11 within the high pressure area 12.

The seal structure further includes an annular stator member 22 positioned in the end wall opening in abutting relation to the end wall member 15. A gas side seal, which is generally referenced 23, is carried within the stator and arranged to encompass the shaft 11 adjacent to the high pressure region 12. The gas side seal includes a cylindrical sleeve-like bushing 24, which encircles the shaft with a running clearance therebetween and a ramp section 25, obliquely disposed from the cylindrical sleeve, which merges with a radially extended flange 26 positioned adjacent to the outer wall of the retaining member 15.

The interior structure of stator 22 is formed to complement the shape of the gas side bushing and contains a plurality of uniformly spaced ports 30 encircling the bushing 23. The ports are connected to an annular high pressure oil groove 33 formed about the outer periphery of the stator. As will be explained in greater detail below, oil under high pressure is supplied to the circumferentially extending groove 31 via an oil inlet channel 35 passing through the machine end wall structure.

A pair of O-rings 38 and 39 are positioned on opposite sides of the flange 26 of the gas side seal and serve to prevent high pressure oil from moving between the stator member 22 and the retaining member 15. A series of pins 27, secured in the stator, extend downwardly into horizontal grooves formed in the outer periphery of the flange 26 to prevent the gas side seal from rotating while, at the same time, permitting the seal to float in both an axial and a radial direction.

In operation, the high pressure oil, which is maintained at a pressure slightly above the working gas pressure, is introduced into port 30 and carried into contact with the shaft beneath the sleeve 24 in the general region designated 31. As a result, the process gases that have moved into this region, come under the influence of the adverse pressure of the high pressure oil and are thus prevented from leaking about the shaft into regions of lower pressure. Any contaminated oil that collects in the oil to gas interface region is removed from the system by means of a conventional purge line 32.

As noted above, the high pressure oil is caused to move axially along the shaft surface from the gas to oil interface region towards the low pressure side of the system. A series of breakdown seals, in the form of free floating bushings 40, 41 and 42, are equally spaced in axial alignment about the shaft behind the gas side seal in the direction of flow. Sufficient spacing is provided between the interior surface of the breakdown of seals and the outer periphery of the shaft whereby the pressure in the flow stream is periodically and uniformly reduced as it moves into the region of lower pressure. The breakdown seals are mounted within annular stators 46, 47 and 48, supported within the shaft opening. As illustrated in FIG. 1, the stators are mounted in axial abutting alignment with the last stator in the tier, stator 48, contacting the outer face of the gas side seal stator 22. The stator tier is restrained against axial movement within the shaft opening by means of a retaining ring 67 fitted to the left-hand face of the end wall structure by any convenient means, such as cap screws or the like. Although not shown, a second outer labyrinth shaft seal can also be supported within the retaining member to further prevent leakage from the machine.

As disclosed in the previously noted Damratowski, et al. patent, it is conventional in this type of sealing arrangement to utilize high pressure oil, not only as a barrier to prevent the escape of working fluids from the machine, but also as a means of cooling the various component parts of the sealing apparatus. It has been found, however, that under certain critical working conditions, and particularly at machine start-up, the volume rate of flow of the high pressure oil passing over the seal surfaces is reduced drastically to a point where the seals become overheated. Under these conditions, any eccentricity in the coacting parts, shaft runout, or machine vibrations are magnified thereby causing excessive seal wear and eventually failure.

A relatively simple system for cooling the seals is herein provided which is capable of operating continuously at a constant level regardless of the operation condition of the machine. To achieve this result, a secondary, low pressure, flow of coolant is arranged to continuously flow in contact with the breakdown seal any time the machine is in operation.

Referring once again to FIG. 1, it can be seen that each oil breakdown seal is within a circumferentially extending recess, 50, 51 and 52, respectively, formed in the body of the breakdown bushing stators. An axially extending annular opening 60 is also provided in each stator body directly behind the recess and is placed in fluid flow communication therewith via feed holes 61. In assembly, the openings coact to create an elongated chamber for containing a fluid under low pressure which is fed through the feed holes into contact with the back side of the breakdown bushings. As will be explained in greater detail below, the low pressure fluid is delivered into channel 60 from a supply reservoir by means of an inlet passage 62 passing through the wall of the machine. The flow rate of the low pressure cooling fluid is regulated by means of an orifice located in the inlet passage whereby a sufficient quantity of fluid is passed over the bushings to maintain the temperature thereof within a constant operating range regardless of the operation condition of the machine. The low pressure fluid, upon passing over the bushings is exhausted from the stator assembly by means of outlet 65 and returned to the supply reservoir.

Although any type of suitable cooling fluid can be employed in the low pressure cooling system, it is preferred that the fluid be of the same substance utilized in the high pressure sealing system. In this arrangement, the control system can be greatly simplified and little or no harm is caused in the event cooling fluid inadvertently leaks from the low pressure cooling side of the system into the high pressure sealing side.

A pair of circumferentially extending O-rings 66 are positioned between the side walls of each recess and the end faces of the breakdown bushings carried therein to isolate the low pressure coolant flow from the primary sealing oil flow. The O-rings are positioned relatively close to the axially extending surface of each bushing facing the shaft so that a preponderance of the bushing surface area is exposed to the coolant flow. To further enhance the cooling process, a series of fin-like elements 68 are formed on the back side of each breakdown bushing to increase the exposure area.

In this particular embodiment of the present invention, the gas side seal 23 is not subjected to secondary cooling. It has been found that the oil, from the primary system, initially coming in contact with this particular seal, is in a relatively cool state and therefore can efficiently dissipate any heat build-up in this particular localized area under most conditions. However, it should be clear to one skilled in the art that secondary cooling of the gas side seal can be maintained when required in a manner similar to that described above in reference to the breakdown seals.

Figure 2:
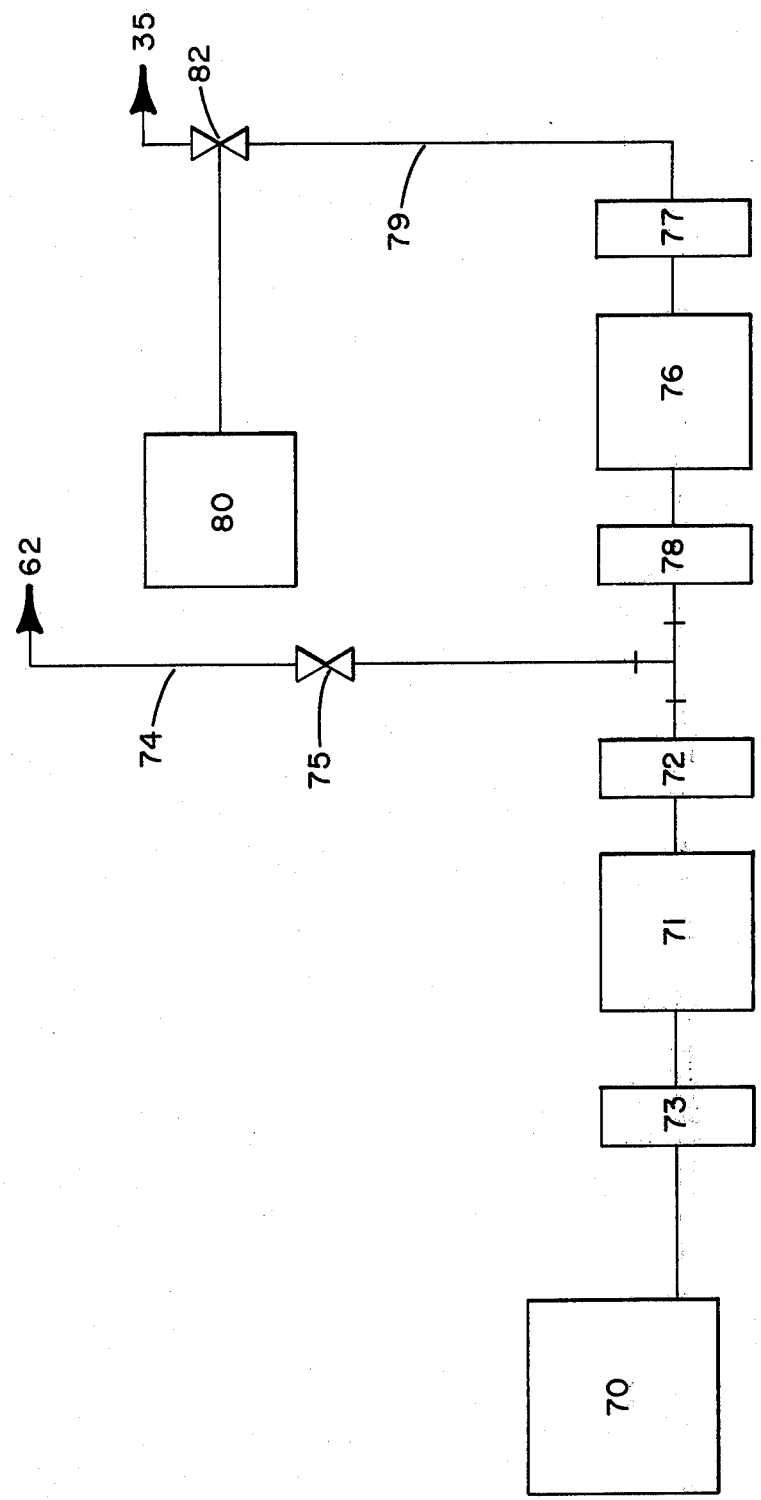
FIG. 2 is a schematic representation illustrating an oil supply system for use in the present invention.

FIG. 2 contains a diagramatic illustration of a pumping network for delivering both the coolant to the secondary flow system and high pressure oil to the primary flow system. It should be noted that the same oil is conveniently utilized to provide fluid to both the primary and secondary systems. This greatly simplifies the controls involved, particularly when compared to sealing devices of this nature requiring oil injection or the like. As shown, oil to both systems is taken from a common oil reservoir 70. Initially the oil is delivered to the low pressure pump 71 which serves to raise the oil pressure to a level needed to move a sufficient quantity of oil to the secondary coolant flow stream to efficiently cool the breakdown of bushings. This pump operates continually to deliver a constant head whenever the machine is in operation. Oil leaving the pump is first passed through a filter 72 and a cooler 73 prior to its being introduced into the stator assembly. A portion of this oil moves via line 74 through a check valve 75 to the inlet channel 62 of the secondary cooling system where it is brought into contact with the breakdown seal as described above.

Oil from the low pressure pump is also delivered to the high pressure pumps 76 which raises the oil pressure to a second level. The high pressure oil leaving the pump is passed through a second filter 77 and cooler 78 and delivered to inlet 35 to the high pressure sealing flow stream via a line 79. A check valve 80 is positioned in the line and operatively associated with a pressure regulator tank 80.

The regulator is arranged to sense the pressure of the working fluid in the machine and in response thereto, adjust the pressure in line 79 via valve 82 to keep the pressure on the high side of the system at some differential above the pressure of the working substance.

As can be seen, this simplified pumping arrangement is capable of delivering a continuous supply of low pressure coolant to the breakdown bushing seals under all machine operating conditions while at the same time providing sealing oil at the required pressure differential to prevent the working fluids from escaping to the surrounding low pressure regions.

While this invention has been described with reference to the structure disclosed herein, it should be understood that the invention is not necessarily confined to the details as set forth and this application is intended to cover any modifications or changes that may come within the scope of the following claims.

What is claimed is:

1. In a shaft sealing device of the type wherein a fluid barrier is established between the shaft and a series of bushing seals to prevent high pressure working substances contained within a pressure vessel from escaping to surrounding areas of relatively lower pressure including a first bushing seal encompassing the shaft and being positioned adjacent to the high pressure region, at least one other seal bushing encompassing said shaft behind said first bushing in the direction of lower pressure and means to introduce sealing fluid into contact with the shaft within the region encompassed by said first bushing whereby said fluid flows between said bushings and the shaft toward the region of lower pressure, the improvement comprising;

a flow passage in said pressure vessel being capable of carrying coolant into thermal communication with said sealing bushings, means for continuously passing a flow of coolant through said passage whereby said bushings are maintained at or below a predetermined temperature level, and sealing means to isolate the coolant flow from the flow of sealing fluid moving between the shaft and said bushings.

2. The apparatus of claim 1 wherein said bushings are provided with cooling fins upon the surface thereof coming into thermal communication with the coolant.

3. The apparatus of claim 1 wherein said coolant moves through the flow passage at a steady rate and uniform pressure when the shaft is in motion.

4. The apparatus of claim 1 wherein the coolant and the sealing fluid are of the same substance supplied from a common reservoir.

5. The apparatus of claim 4 wherein the said coolant is precooled prior to being passed through said flow passage.

6. The apparatus of claim 4 wherein said coolant is oil maintained at a pressure relatively lower than the pressure of the sealing fluid.

7. The apparatus of claim 6 further including;

a first pump means for raising the pressure of said oil to a first uniform pressure level;

a second pump means operatively connected to the output of said first pump means for raising the pressure of the oil to a second higher level, and regulator means for maintaining said second pressure level at a preset differential above the pressure of the working substance contained within the pressure vessel.

* * * * *